(12) United States Patent
Sato

(10) Patent No.: US 12,294,276 B2
(45) Date of Patent: May 6, 2025

(54) FAN MOTOR

(71) Applicant: MINEBEA MITSUMI Inc., Nagano (JP)

(72) Inventor: Masaaki Sato, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 367 days.

(21) Appl. No.: 17/753,494

(22) PCT Filed: Aug. 17, 2020

(86) PCT No.: PCT/JP2020/030948
§ 371 (c)(1),
(2) Date: Mar. 4, 2022

(87) PCT Pub. No.: WO2021/049252
PCT Pub. Date: Mar. 18, 2021

(65) Prior Publication Data
US 2022/0329129 A1 Oct. 13, 2022

(30) Foreign Application Priority Data
Sep. 10, 2019 (JP) .................. 2019-164706

(51) Int. Cl.
*H02K 5/22* (2006.01)
*H02K 5/02* (2006.01)
(Continued)

(52) U.S. Cl.
CPC ............... *H02K 5/225* (2013.01); *H02K 5/02* (2013.01); *H02K 5/08* (2013.01); *H02K 5/10* (2013.01); *H02K 7/14* (2013.01); *H02K 2203/03* (2013.01)

(58) Field of Classification Search
CPC .................................. H02K 5/08; H02K 5/02
(Continued)

(56) References Cited

U.S. PATENT DOCUMENTS 3,313,983 A * 4/1967 Mallett .................. H01F 27/04
361/128
5,436,519 A 7/1995 Takahashi et al.
(Continued)

FOREIGN PATENT DOCUMENTS

CN 108730211 A 11/2018
CN 208128023 U 11/2018
(Continued)

OTHER PUBLICATIONS

Tanaka, "Mold Motor", (2009), English Machine Translation (Year: 2009).*
(Continued)

*Primary Examiner* — Terrance L Kenerly
*Assistant Examiner* — Theodore L Perkins
(74) *Attorney, Agent, or Firm* — Chrisman Gallo Tochtrop LLC

(57) ABSTRACT

A stator, a circuit board for supplying a current to the stator, a rotor rotating by the current supplied to the stator, a lead wire connecting an external power supply to the circuit board, and a first mold resin covering at least a portion of the stator, at least a portion of the circuit board, and a portion of the lead wire, and a second mold resin covering a predetermined range from the first mold resin of the lead wire led out from the first mold resin are provided. The second mold resin has the hardness lower than the hardness of the first mold resin.

17 Claims, 10 Drawing Sheets

(51) Int. Cl.
*H02K 5/08* (2006.01)
*H02K 5/10* (2006.01)
*H02K 7/14* (2006.01)

(58) Field of Classification Search
USPC .......................................................... 310/43
See application file for complete search history.

(56) References Cited

U.S. PATENT DOCUMENTS

| | | | |
|---|---|---|---|
| 6,359,354 B1 * | 3/2002 | Watanabe | F04D 25/0693 |
| | | | 310/43 |
| 6,394,767 B1 | 5/2002 | Matsumoto | |
| 7,837,391 B2 * | 11/2010 | Kitamura | H02K 5/1735 |
| | | | 384/510 |
| 9,657,879 B1 * | 5/2017 | Currey | F25D 1/00 |
| 10,020,206 B2 * | 7/2018 | Morris | H01L 23/29 |
| 2006/0022485 A1 * | 2/2006 | Cowelchuk | B60R 13/02 |
| | | | 296/146.7 |
| 2010/0148596 A1 * | 6/2010 | Asou | H02K 5/207 |
| | | | 310/43 |
| 2011/0074230 A1 * | 3/2011 | Hasegawa | H02K 11/33 |
| | | | 310/43 |
| 2016/0111931 A1 * | 4/2016 | Kakuda | H02K 5/08 |
| | | | 310/43 |
| 2018/0252222 A1 | 9/2018 | Yamasaki et al. | |
| 2018/0252223 A1 * | 9/2018 | Yamasaki | H02K 5/16 |

FOREIGN PATENT DOCUMENTS

| | | | |
|---|---|---|---|
| EP | 2 852 033 B1 | | 11/2016 |
| JP | H08-51741 A | | 2/1996 |
| JP | H09-121497 A | | 5/1997 |
| JP | 2000-116098 A | | 4/2000 |
| JP | 2003-028670 A | | 1/2003 |
| JP | 2005-341640 A | | 12/2005 |
| JP | 2009112067 A | * | 5/2009 |
| JP | 2011-078224 A | | 4/2011 |
| JP | 2012-080747 A | | 4/2012 |
| JP | 2018-148606 A | | 9/2018 |
| KR | 20020081514 A | | 10/2002 |

OTHER PUBLICATIONS

International Search Report for corresponding International Application No. PCT/JP2020/030948 mailed Oct. 6, 2020.
Extended European Search Report dated Aug. 30, 2023 for corresponding European Application No. 20862347.0.
Office Action dated Apr. 11, 2024 for corresponding European Application No. 20862347.0.
Costa M.C.B. et al., "Empirical Models for End-Use Properties Prediction: Application to Injection Modeling of Some Polyethylene Resins", Journal of Applied Polymer Science, vol. 114, No. 6, Dec. 15, 2009, pp. 3780-3792.
Chinese Office Action dated Jun. 28, 2024 for corresponding Chinese Application No. 202080062672.9 and English translation.
International Preliminary Report on Patentability dated Mar. 15, 2022 for corresponding International Application No. PCT/JP2020/030948.
Rejection Decision dated Dec. 30, 2024 for corresponding Chinese Application No. 202080062672.9.

* cited by examiner

FAN MOTOR

TECHNICAL FIELD

The present invention relates to a fan motor such as an axial fan or a centrifugal fan, and more particularly to a fan motor including components molded with a resin.

BACKGROUND ART

A fan motor having water resistance and oil resistance is manufactured by molding a stator, a circuit board, a part of a lead wire, and the like with a resin. Since stress is concentrated in the vicinity of a lead-out portion of the lead wire led out from the mold resin, the lead wire may be damaged during work performed before the molded components are installed at a casing.

As a means for protecting the lead-out portion of the lead wire led out from the mold resin, for example, Patent Literature 1 discloses a technology for protecting the vicinity of the lead-out portion of the lead wire by molding the components in a state where the lead wire is inserted into a grommet member made of an elastic body or the like.

CITATION LIST

Patent Literature

PTL1: JP 2009-112067 A

SUMMARY OF INVENTION

Technical Problem

However, with the technology described in Patent Literature 1, problems are an increase in the number of components called grommet members and also poor workability due to the complicated work of inserting the lead wire into the grommet members.

The present invention has been made in view of the above-described circumstance, and an object of the present invention is to provide a fan motor capable of protecting the lead-out portion of the lead wire led out from the mold resin and suppressing the damage without using separate components such as the grommet members.

Solution to Problem

The present invention is a fan motor including a stator, a circuit board for supplying a current to the stator, a rotor rotating by the current supplied to the stator, a lead wire connecting an external power supply to the circuit board, and a mold resin covering at least a portion of the stator, at least a portion of the circuit board, and a portion of the lead wire, and the mold resin including a first mold resin covering at least a portion of the stator, at least a portion of the circuit board, and a portion of the lead wire, and a second mold resin covering a predetermined range from the first mold resin of the lead wire led out from the first mold resin, and the second mold resin has hardness lower than hardness of the first mold resin.

In the molded motor of the present invention, the second mold resin having hardness lower than hardness of the first mold resin functions as the grommet member, and of course, the lead-out portion of the lead wire led out from the mold resin can be protected to suppress the damage. In addition, components such as the grommet members are not required. Therefore, the workability is good, because the lead wire need not be inserted into the grommet members.

Here, at least the portion of the stator, at least the portion of the circuit board, and the portion of the lead wire are covered with the first mold resin to form a mold body, a concave portion or a cutout portion is provided at a portion of an outer circumferential part of the mold body where the lead wire is led out, and the second mold resin can be provided at the concave portion or the cutout portion. In such an aspect, the second mold resin can be formed so as not to protrude from a contour of the mold body, and the appearance can remain the same as the appearance of the related art.

Contrary to the aspect described above, the second mold resin can also be protruded from the mold body. In other words, at least the portion of the stator, at least the portion of the circuit board, and the portion of the lead wire are covered with the first mold resin to form the mold body, and a protruding portion made of the second mold resin can be provided in a predetermined range of the lead wire protruding from the mold body. In such an aspect, the length of the protruding portion can be set as desired, and the protection of the lead wire can be reliably performed.

In the present invention, a configuration of combining the concave portion or the cutout portion and the protruding portion as described above is also possible. In other words, at least the portion of the stator, at least the portion of the circuit board, and the portion of the lead wire are covered with the first mold resin to form a mold body, the concave portion or the cutout portion is provided at the portion of an outer circumferential part of the mold body where the lead wire is led out, the second mold resin is provided at the concave portion or the cutout portion, and the protruding portion made of the second mold resin protruding from the outer circumferential part of the mold body can be provided integrally with the second mold resin provided at the concave portion or the cutout portion.

Further, the second mold resin covering the outer circumference of the lead wire can be provided at the lead wire protruding from the first mold resin or the second mold resin in a predetermined range from the first mold resin or the second mold resin.

In the present invention, the first and second mold resins are thermosetting resins, for example, and the second mold resin may have a curing start temperature lower than a curing start temperature of the first mold resin. In such an aspect, the first and second mold resins can be formed separately by filling a mold with the second mold resin and then raising the temperature to perform curing, and then filling the mold with the first mold resin and further raising the temperature to perform curing.

Further, it is preferable that the hardness of the first mold resin at 23° C. is, for example, D70 or more, and the hardness of the second mold resin at 23° C. is, for example, A90 or less.

Advantageous Effects of Invention

According to the present invention, a motor capable of protecting the lead-out portion of the lead wire led out from the mold resin and suppressing the damage is provided without using separate components such as the grommet members.

BRIEF DESCRIPTION OF DRAWINGS

FIG. 3 illustrates a third embodiment of the present invention.

FIG. 4 illustrates a fourth embodiment of the present invention.

FIG. 5 illustrates a fifth embodiment of the present invention.

FIG. 6 illustrates a sixth embodiment of the present invention.

FIG. 7 illustrates a seventh embodiment of the present invention.

FIG. 8 illustrates an eighth embodiment of the present invention.

FIG. 9 illustrates a ninth embodiment of the present invention.

DESCRIPTION OF EMBODIMENTS

1. First Embodiment

Overall Configuration of Axial Fan

Figure 1A:
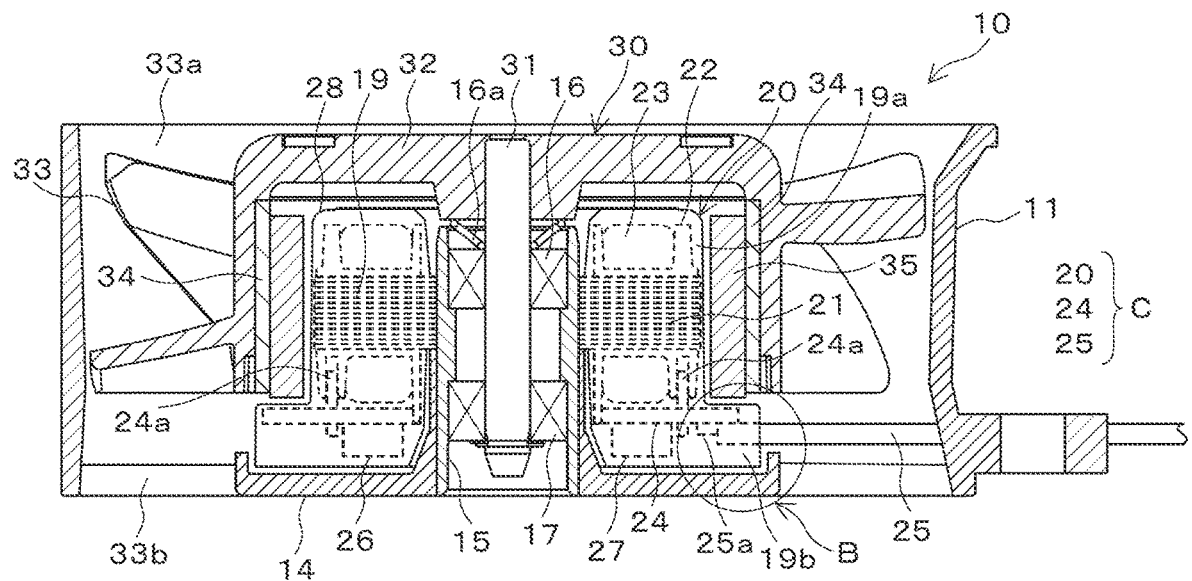
FIG. 1(A) is a cross-sectional view illustrating an axial fan of a first embodiment of the present invention.
Figure 1B:
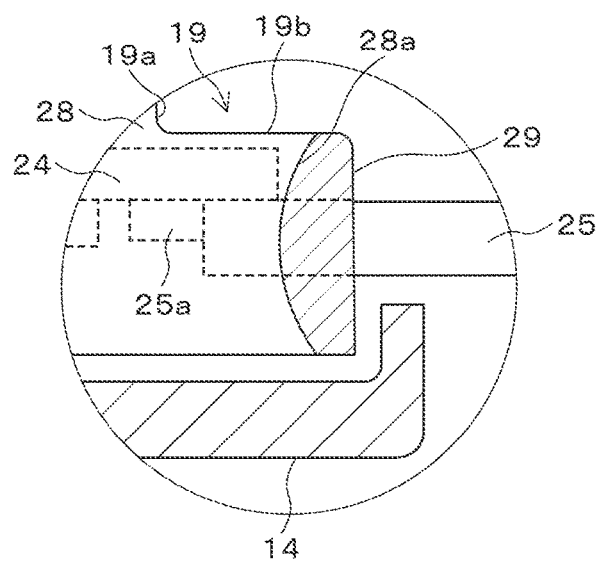
FIG. 1(B) is an enlarged view of a portion indicated by an arrow B in FIG. 1(A).

FIG. 1(A) is an axial cross-sectional view illustrating a fan motor 10 of an embodiment of the present invention applied to an axial fan, and FIG. 1(B) is an enlarged view of a portion indicated by an arrow B in FIG. 1(A). As illustrated in FIG. 1(A), the fan motor 10 of the embodiment includes a casing 11 made of a synthetic resin, a stator 20, and a rotor 30.

The casing 11 includes a base portion 14 at the center of a base end portion and a cylindrical bearing housing 15 fixed to the center of the base portion 14. The bearing housing 15 is made of a metal such as brass, for example, and is insert molded into the casing 11. A pair of ball bearings 16 and 17 is fixed to the inner circumference of the bearing housing 15 so as to be separated from each other by means of press-fitting or the like. In FIG. 1(A), a reference symbol 16a denotes a coil spring for applying preload to the ball bearings 16 and 17.

The stator 20 is disposed at the outer circumferential side of the bearing housing 15 and includes a stator core 21 including a plurality of protruding poles extending outward in the radial direction, a bobbin 22 mounted at the stator core 21, and a coil 23 wound around the bobbin 22. A circuit board 24 is fixed at the lower portion of the bobbin 22 around the base portion of the bearing housing 15. A drive circuit for driving the fan motor 10 is formed and electronic components 26 and 27 are mounted, at the circuit board 24.

A lead wire 25 for energizing the drive circuit is connected to the circuit board 24. An end portion 25a of the lead wire 25 is soldered to the circuit board 24 after a cover made of a resin such as polyvinyl chloride or polyethylene is peeled off. In the drawing, the reference symbol 24a is a connector pin connecting the circuit board 24 and the coil 23 with each other, in a state of being inserted into the circuit board 24 and the bobbin 22. As a result, the stator 20, the circuit board 24, and the lead wire 25 are integrally joined to form a stator assembly C.

The rotor 30 includes a shaft 31 made of a metal fixed to the ball bearings 16 and 17 by means of press-fitting or the like, and a hub 32 having a cup shape with the shaft 31 being insert molded. A plurality of blades 33 are integrally formed at an outer circumference of a cylindrical portion of the hub 32, and a yoke 34 is fixed to an inner circumference of the cylindrical portion of the hub 32. A magnet 35 is fixed to an inner circumference of the yoke 34, and the magnet 35 is arranged to be opposed to an outer circumference of the stator 20.

In the fan motor 10 having the configuration described above, an opening portion at an upper end side of the blades 33 forms an air suction port 33a, and an opening portion at a lower end side forms a discharge port 33b. Further, in the fan motor 10, a portion of the lead wire 25 up to the vicinity of the circuit board 24 of the stator assembly C including the stator 20, the circuit board 24, and the lead wire 25 is integrally molded with a first mold resin 28 and a second mold resin 29 before being assembled to the casing 11. Note that, in the following description, a portion of the stator assembly C molded with the first mold resin 28 is referred to as a mold body 19. The mold body 19 formed in this manner is a cylindrical body including a cylindrical portion 19a covering the stator 20 and a flange portion 19b covering the circuit board 24.

Configuration of Lead-Out Portion of Lead Wire

FIG. 1(B) is a diagram illustrating details of the lead-out portion of the lead wire 25 led out from the first mold resin 28. As illustrated in FIG. 1(B), the concave portion 28a is formed at a part of the flange portion 19b of the mold body 19 where the lead wire 25 is led out, and the concave portion 28a is filled with the second mold resin 29. Note that the shape of the concave portion 28a is not particularly limited, and may be, for example, a cutout portion with an arc-shaped portion missing in a plan view.

The first mold resin 28 is, for example, an epoxy resin of a thermosetting resin, and the second mold resin 29 is, for example, a urethane resin of a thermosetting resin. The second mold resin 29 has the hardness lower than the hardness of the first mold resin 28. For example, the hardness of the first mold resin 28 at 23° C. is D70 or more, and the hardness of the second mold resin 29 at 23° C. is A90 or less. Preferably, the hardness of the second mold resin 29 at 23° C. is from A30 to A80. In a case where the hardness of the second mold resin is within this range, the lead wire 25 can be more appropriately protected during work until the stator assembly C with the mold body being formed is attached to the casing 11. Further, more preferably, the hardness of the first mold resin 28 is from D80 to D95, the glass transition point is 125° C. or higher, and the linear expansion coefficient at or below the glass transition point is desirably $4 \times 10^{-5}$/° C. or less. In a case where the characteristics of the first mold resin 28 such as the hardness, the glass transition point, and the linear expansion coefficient at or below the glass transition point are within these ranges, the difference between above characteristics of the first mold resing 28 and above characteristics of each component constituting the stator assembly C is decreased. As a result, an occurrence of internal stress caused by a change in temperature can be suppressed, the damage to each component constituting the stator assembly C caused by thermal shock can be prevented, and water resistance and oil resistance can be ensured for a longer period of time. Note that the hardness here is measured in accordance with JIS K 7215 (durometer: type A and D), and the glass transition point and the thermal expansion coefficient are measured in accordance with JIS K 7121.

The lead-out portion of the lead wire 25 as described above is configured as follows. First, in a state where an upper mold of a mold is open, a part to be the lead-out portion of the lead wire 25 of a lower mold is filled with a portion of the second mold resin 29 having fluidity, and in this state, the stator assembly C is placed at the lower mold. Next, the part to be the lead-out portion of the lead wire 25 is filled with a remaining portion of the second mold resin 29, and the upper mold and the lower mold are closed. Next, the upper mold and the lower mold are heated, and the second mold resin 29 is cured.

Next, a remaining space of the mold is filled (injected) with the first mold resin 28 having fluidity, the mold is heated again, and the first mold resin 28 is cured. When the first mold resin 28 is cured, the upper mold is opened, and the stator assembly C with the mold body 19 being formed is taken out. Then, the stator assembly C is attached to the casing 11, and the shaft 31 of the rotor 30 is fixed to the ball bearings 16 and 17, so that the fan motor 10 is configured.

In the fan motor 10 having the configuration described above, the second mold resin 29 functions as the grommet member, and of course, the lead-out portion of the lead wire 25 led out from the first mold resin 28 can be protected to suppress the damage. In addition, components such as the grommet members are not required. Therefore, the workability is good, because the lead wire 25 need not be inserted into the grommet members.

In particular, in the first embodiment described above, since the second mold resin 29 does not protrude from a circular contour of the mold body 19, an advantage is the same appearance as the appearance of the related art. Further, since the second mold resin 29 having a curing start temperature lower than a curing start temperature of the first mold resin 28 is used, the first and the second mold resins 28 and 29 can be separately formed, by filling the mold with the second mold resin 29 and curing the second mold resin 29 and then continuously filling the mold with the first mold resin 28 and curing the first mold resin 28 without cooling the mold. Alternatively, the first and the second mold resins 28 and 29 can be separately formed, by filling the mold with the second mold resin 29 and raising the temperature up to the curing start temperature or higher of the first mold resin 18 to perform curing and then filling the mold with the first mold resin 28 to perform curing. The difference between the curing start temperature of the first mold resin 28 and the curing start temperature of the second mold resin 29 is not particularly limited, but is preferably 10° C. or higher. Since the difference between the curing start temperatures is 10° C. or higher, a series of steps of curing the first mold resin 28 after curing the second mold resin 29 can smoothly proceed, and the workability is improved. Note that "curing start temperature" here refers to a temperature of beginning of occurrence of a raising peak indicating curing in a graph showing the relationship between the temperature and the calorific value obtained by differential scanning calorimetry (DSC).

2. Second Embodiment

Figure 2A:
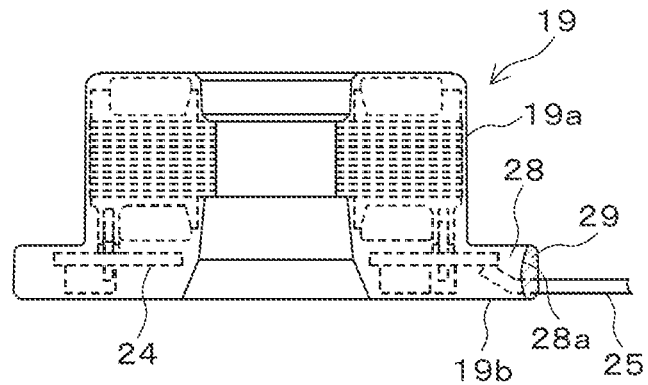
FIG. 2(A) is a side view illustrating a mold body of a modified example of the first embodiment.
Figure 2B:
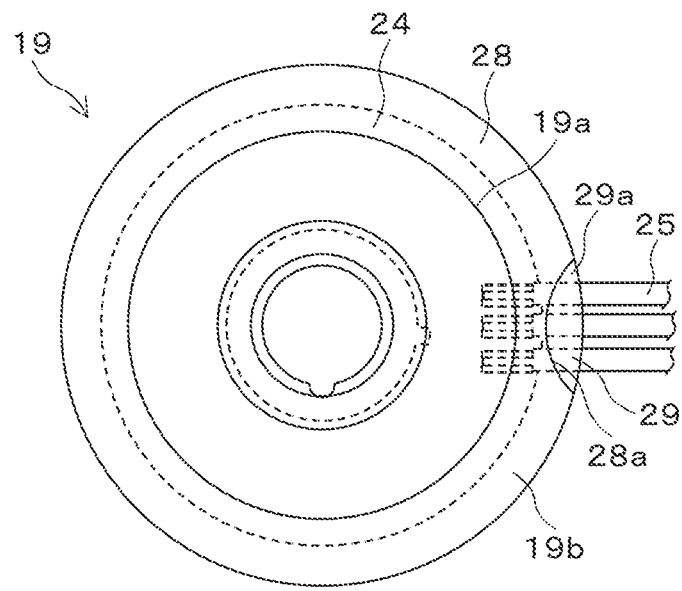
FIG. 2(B) is a plan view of a second embodiment of the present invention.
Figure 2C:
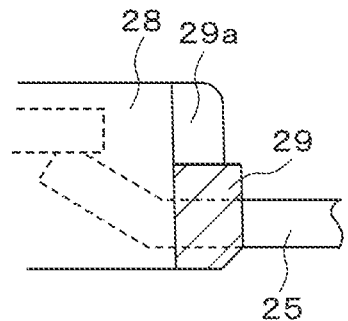
FIG. 2(C) is an enlarged view of a main portion of FIG. 2(B).

FIG. 2(A) is a diagram illustrating a modified example of the first embodiment, and illustrates an example of the lead wire 25 being biased in a direction away from the circuit board 24. FIGS. 2(B) and 2(C) are diagrams illustrating a second embodiment of the present invention, and the second mold resin 29 in FIG. 2(A) has a configuration equivalent to the configuration of the above-described embodiment. However, in FIGS. 2(B) and 2(C), a cutout portion 29a is provided at an upper portion of the second mold resin 29. In such a second embodiment, the amount of the second mold resin 29 used can be reduced.

3. Third Embodiment

Figure 3A:
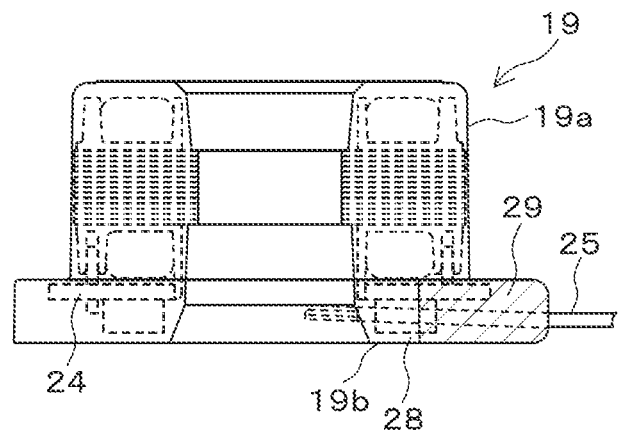
FIG. 3(A) is a side view illustrating a mold body.
Figure 3B:
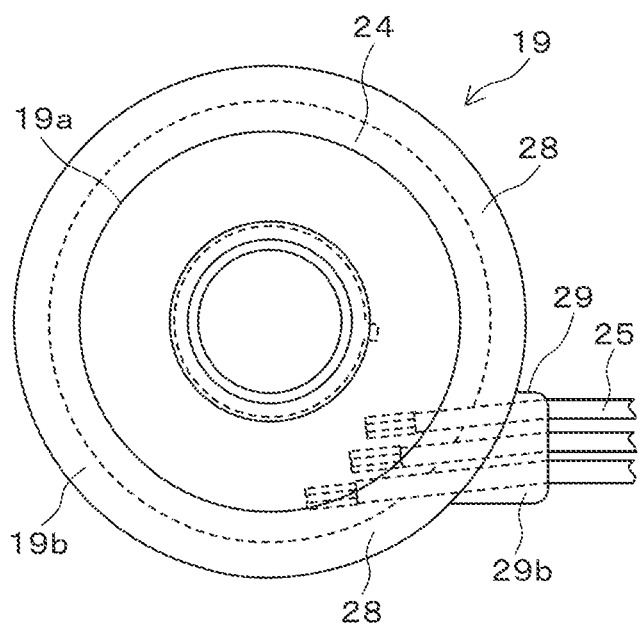
FIG. 3(B) is a plan view of the mold body.

The above-described first and second embodiments are examples of the concave portion 28a being provided at the outer circumferential part of the flange portion 19b of the mold body 19, and the concave portion 28a being filled with the second mold resin 29. In contrast, in the third embodiment illustrated in FIG. 3, the concave portion 28a is not provided at the outer circumferential part of the flange portion 19b, and a protruding portion 29b made of the second mold resin 29 protruding from the outer circumferential part of the flange portion 19b is formed at a part provided with the lead wire 25 led out from the first mold resin 28. In the third embodiment, the lead wire 25 can be appropriately protected by appropriately setting the protruding length of the protruding portion 29b. Further, a direction the lead wire 25 being led out is not particularly limited, but in the third embodiment, the lead wire 25 is led out in a direction not passing through the center of the mold body 19. As a result, the protruding portion 29b has a substantially trapezoidal shape in a plan view, and the amount of protrusion of the mold body 19 outward in the radial direction is suppressed.

4. Fourth Embodiment

Figure 4A:
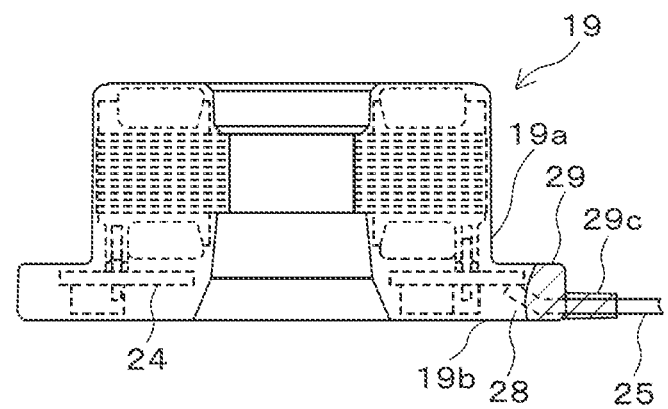
FIG. 4(A) is a side view illustrating a mold body.
Figure 4B:
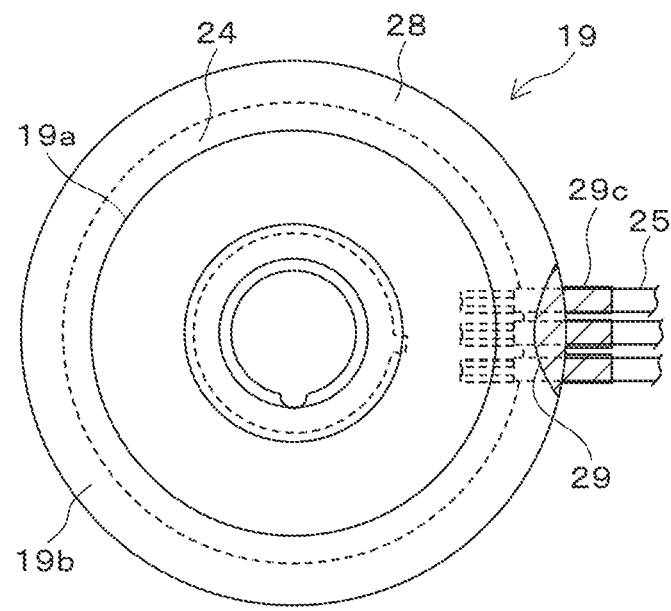
FIG. 4(B) is a plan view of the mold body.

FIG. 4 is a diagram illustrating a fourth embodiment of the present invention. In the fourth embodiment, in the mold body 19 illustrated in FIG. 2(A), an outer circumferential surface of the lead wire 25 protruding from the second mold resin 29 filling the concave portion 28a is covered with a cover portion 29c made of the second mold resin 29 in a predetermined range from the second mold resin 29 filling the concave portion 28a. In such a fourth embodiment, since the lead wire 25 is more appropriately protected by the second mold resin 29 entering into the mold body 19, and the cover portion 29c, the damage to the lead wire 25 can be further suppressed. Note that in a case where there are a plurality of lead wires 25, the cover portion 29c covers an outer circumferential surface of each of the plurality of lead wires 25, but adjacent cover portions 29c may be partially joined or separated from each other. In the fourth embodiment, the cover portions 29c covering the plurality of lead wires 25 are formed separated from each other.

5. Fifth Embodiment

Figure 5A:
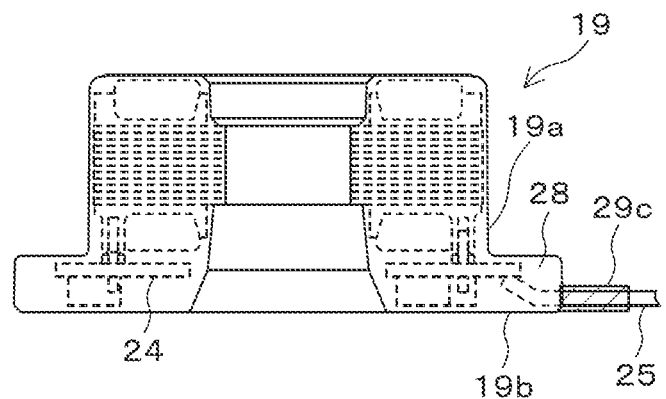
FIG. 5(A) is a side view illustrating a mold body.
Figure 5B:
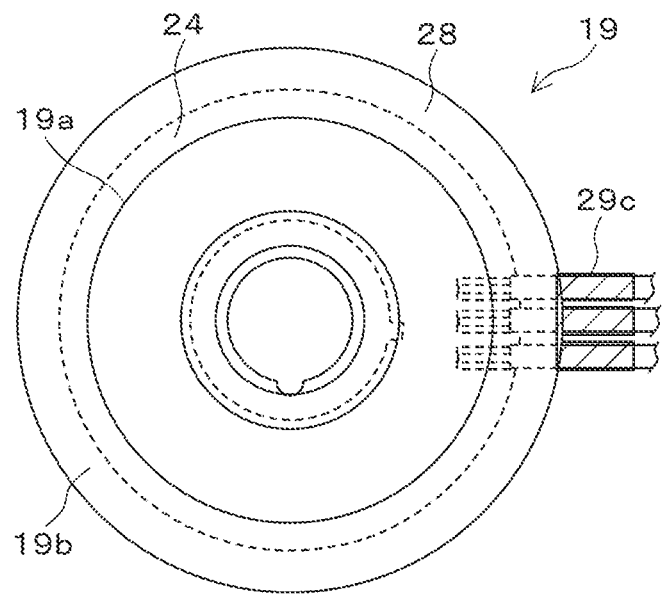
FIG. 5(B) is a plan view of the mold body.

FIG. 5 is a diagram illustrating a fifth embodiment of the present invention. In the fifth embodiment, the lead wire 25 protruding from the flange portion 19b is covered with the cover portion 29c made of the second mold resin 29. In such a fifth embodiment as well, since the lead wire 25 is protected by the cover portion 29c, the damage to the lead wire 25 can be suppressed.

6. Sixth Embodiment

Figure 6A:
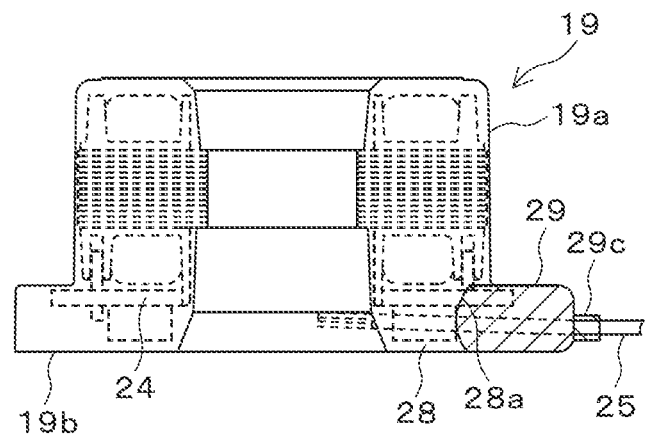
FIG. 6(A) is a side view illustrating a mold body.
Figure 6B:
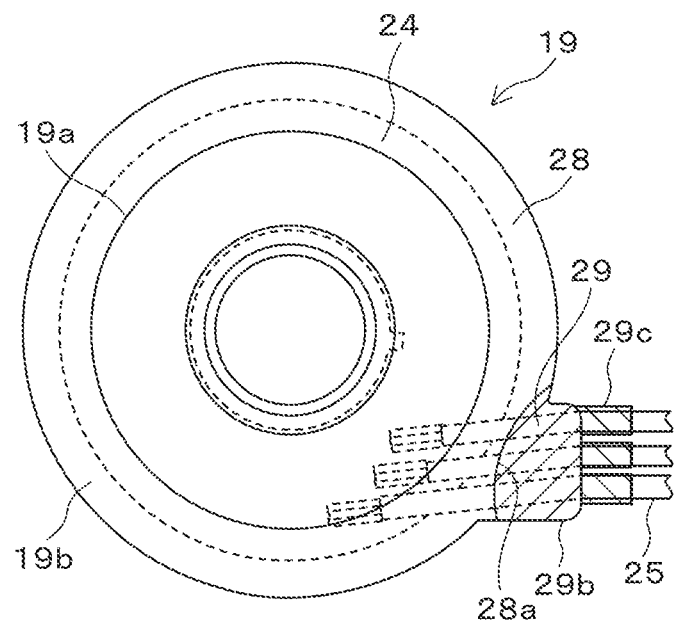
FIG. 6(B) is a plan view of the mold body.

FIG. 6 is a diagram illustrating a sixth embodiment of the present invention. In the sixth embodiment, the concave portion 28a is formed at a part of the flange portion 19b where the lead wire 25 is led out, and the concave portion 28a is filled with the second mold resin 29. The second mold resin 29 is provided so as to protrude from the outer circumferential part of the flange portion 19b, and a protruding portion 29b is formed. Further, a cover portion 29c is provided at the lead wire 25 led out from the protruding portion 29b. In such a sixth embodiment, since the lead wire 25 is protected by the second mold resin 29 inside the concave portion 28a or the cutout portion, and the second mold resin 29 of the protruding portion 29b and the cover portion 29c, the damage to the lead wire 25 can be further effectively suppressed.

7. Seventh Embodiment

Figure 7A:
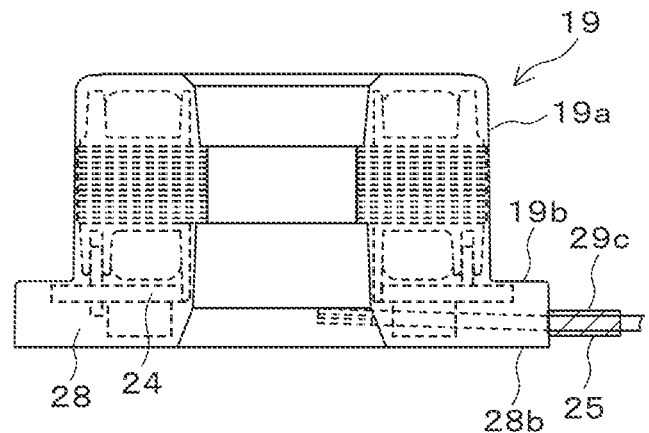
FIG. 7(A) is a side view illustrating a mold body.
Figure 7B:
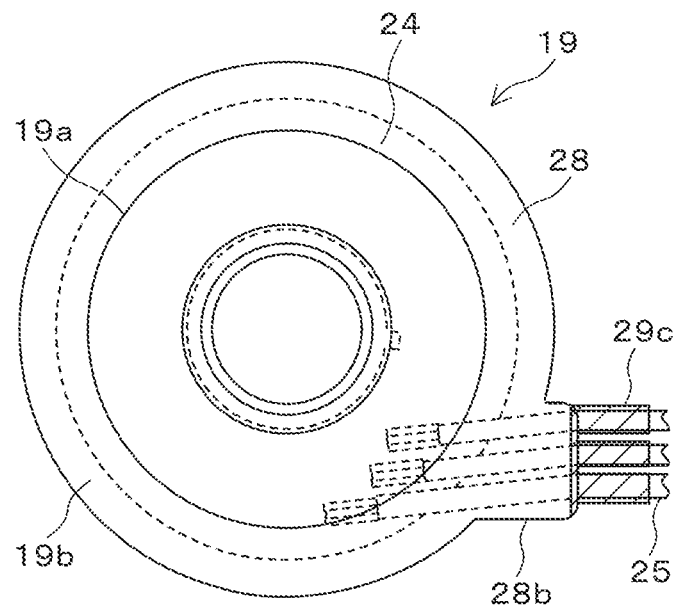
FIG. 7(B) is a plan view of the mold body.

FIG. 7 is a diagram illustrating a seventh embodiment of the present invention. In the seventh embodiment, a protruding portion 28b made of the first mold resin 28 protruding from the outer circumferential part of the flange portion 19b is formed at a part of the flange portion 19b where the lead wire 25 is led out. Further, the cover portion 29c made of the second mold resin 29 is provided at the lead wire 25 led out from the protruding portion 28b. In such a seventh embodiment as well, since the lead wire 25 is protected by the cover portion 29c, the damage to the lead wire 25 can be suppressed.

8. Eighth Embodiment

Figure 8A:
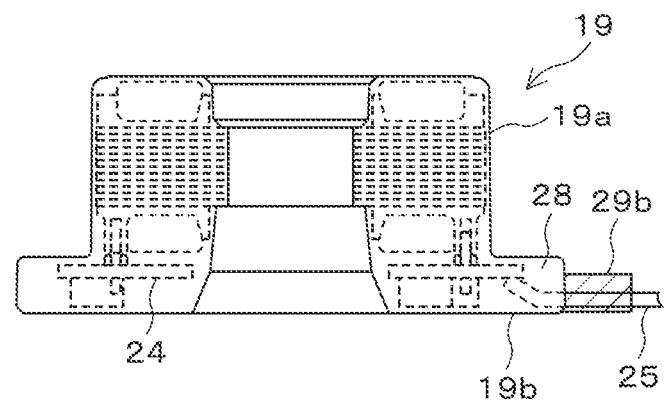
FIG. 8(A) is a side view illustrating a mold body.
Figure 8B:
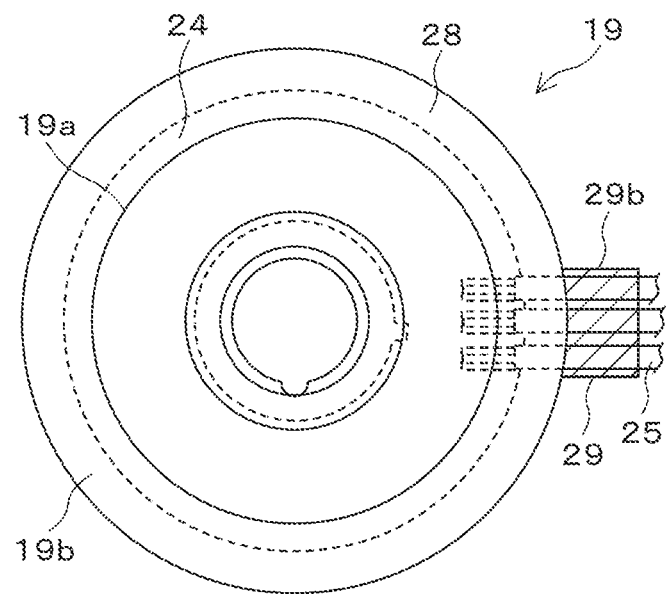
FIG. 8(B) is a plan view of the mold body.

FIG. 8 is a diagram illustrating an eighth embodiment of the present invention. In the eighth embodiment, the lead wire 25 is led out in a direction passing through the center of the mold body 19. The concave portion 28a is not provided at the outer circumferential part of the flange portion 19b, and a protruding portion 29b made of the second mold resin 29 protruding from the outer circumferential part of the flange portion 19b is formed at a part of the first mold resin 28 where the lead wire 25 is led out. The eighth embodiment can also be regarded as a modified example of the fifth embodiment illustrated in FIG. 5. In the eight embodiment as well, the lead wire 25 can be appropriately protected by appropriately setting the protruding length of the protruding portion 29b. Further, the amount of the second mold resin 29 used can be reduced by appropriately setting the height of the protruding portion 29b.

9. Ninth Embodiment

Figure 9A:
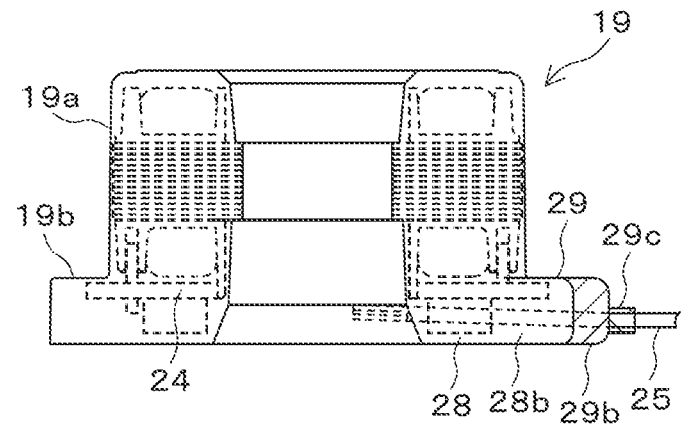
FIG. 9(A) is a side view illustrating a mold body.
Figure 9B:
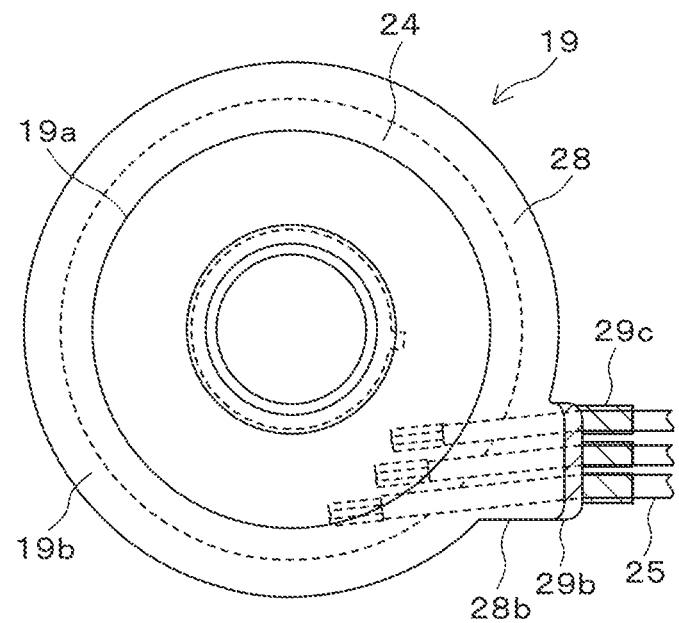
FIG. 9(B) is a plan view of the mold body.

FIG. 9 is a diagram illustrating a ninth embodiment of the present invention. In the ninth embodiment, a protruding portion 28b made of the first mold resin 28 protruding from the outer circumferential part of the flange portion 19b is formed at a part of the flange portion 19b where the lead wire 25 is led out. Further, the protruding portion 29b made of the second mold resin 29 is formed at a tip end portion of the protruding portion 28b. Then, the cover portion 29c is provided at the lead wire 25 led out from the protruding portion 29b. In such a ninth embodiment, since the circuit board 24 can be more reliably covered with the first mold resin 28 by providing the protruding portion 28b, water resistance and oil resistance can be more appropriately ensured and the lead wire 25 is protected by the protruding portion 29b and the cover portion 29c, so that the damage to the lead wire 25 can be effectively suppressed.

In the embodiment described above, the first and second mold resins 28 and 29 are made of the thermosetting resins, but may also be made of thermoplastic resins. In this case, in a state where the upper mold of the mold is open, the part to be the lead-out portion of the lead wire 25 of the lower mold is filled with the portion of molten second mold resin 29, and in this state, the stator assembly C is placed at the lower mold. Next, the part to be the lead-out portion of the lead wire 25 is filled with a remaining portion of the second mold resin 29, and the upper mold and the lower mold are closed. Since the upper mold and the lower mold are at room temperature, the second mold resin 29 is cooled to start curing. Next, a remaining space of the mold is filled (injected) with the first mold resin 28, and is cooled to perform curing.

10. Application to Other Fan Motors

Figure 10A:
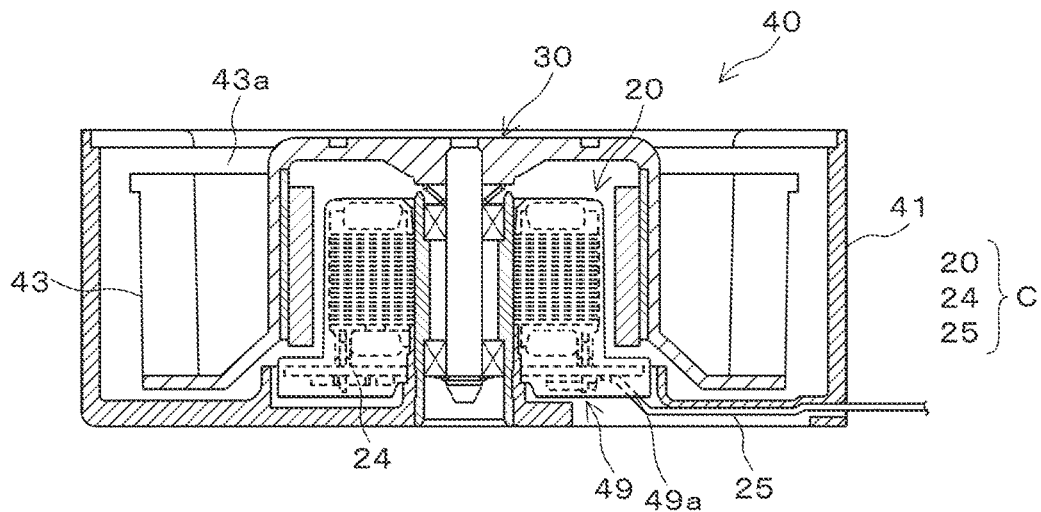
FIG. 10(A) is a cross-sectional view illustrating a fan motor (blower fan) of a modified example of the embodiments of the present invention.
Figure 10B:
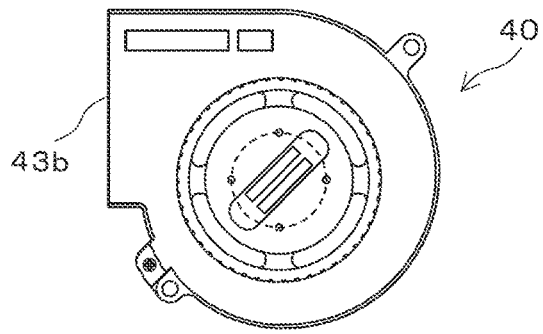
FIG. 10(B) is a plan view of the fan mortar.

The present invention is not limited to the fan motor 10 for the axial fan such as the above-described embodiments, but can be applied to various fan motors. For example, the present invention can be applied to a fan motor 40 for a blower fan (sirocco fan) as illustrated in FIG. 10. The fan motor 40 includes a stator 20 and a rotor 30 similar to the stator and the rotor of the above-described first embodiments. Further, a casing 41 includes a blade 43, and an opening portion at the upper end side of the blade 43 forms an air suction port 43a, and a discharge port 43b is provided at a side portion of the casing 41.

In such a fan motor 40 as well, the stator 20, the circuit board 24, and the lead wire 25 form an integrally joined stator assembly C, and the stator assembly C is molded to form a mold body 49. The lead-out portion 49a from the mold body 49 of the lead wire 25 has a configuration equivalent to the configuration of the above-described embodiments. In such a fan motor 40 as well, an effect equivalent to the effect of the above-described embodiments can be obtained.

Figure 11:
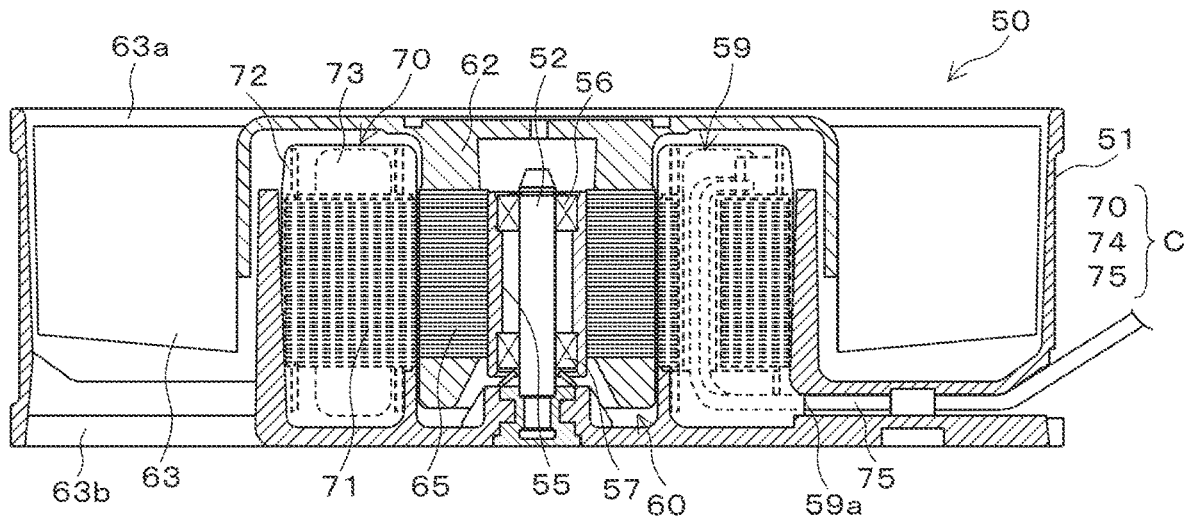
FIG. 11 is a cross-sectional view illustrating a fan motor (AC axial fan) of another modified example of the embodiments of the present invention.

The present invention is not limited to an outer rotor type fan motor as described in the above embodiment, but can also be applied to an inner rotor type fan motor. FIG. 11 illustrates a fan motor 50 applied to such an AC axial fan. The fan motor 50 includes a casing 51, a rotor 60, and a stator 70.

A shaft 52 is fixed to the center of the casing 51, and the rotor 60 is rotatably supported at the shaft 52 by a bearing housing 55 and a pair of ball bearings 56 and 57. The rotor 60 includes a hub 62 and a magnet 65 fixed at an outer circumferential part of the bearing housing 55, and a blade 63 is formed at an outer circumferential part of the hub 62.

The stator 70 attached to the casing 51 is disposed at an outer circumferential side of the magnet 65. The stator 70 includes a stator core 71 including a plurality of protruding poles extending radially toward the inner circumferential side, a bobbin 72 mounted at the stator core 71, and a coil 73 wound around the bobbin 72. A lead wire 75 is connected to the coil 73.

In the fan motor 50 having the configuration described above, an opening portion at the upper end side of the blades 63 forms an air suction port 63a, and an opening portion at the lower end side forms a discharge port 63b. In such a fan motor 50 as well, the stator 70 and the lead wire 75 form an integrally joined stator assembly C, and the stator assembly C is molded to form a mold body 59. The lead-out portion 59a of the lead wire 75 led out from the mold body 59 has a configuration equivalent to the configuration of the above-described embodiments, and the same effect as the above-described embodiments can be obtained even in such a fan motor 50.

INDUSTRIAL APPLICABILITY

The present invention can be used in the technical field of a fan motor such as an axial fan and a blower fan.

REFERENCE SIGNS LIST

10 Fan motor
11 Casing
14 Base portion
15 Bearing housing
16 Ball bearing
17 Ball bearing
16a Coil spring
19 Mold body
19a Cylindrical portion
19b Flange portion
20 Stator
21 Stator core
22 Bobbin
23 Coil
24 Circuit board
24a Connector pin
25 Lead wire
26 Electronic component
27 Electronic component
28 First mold resin
28a Concave portion
28b Protruding portion
29 Second mold resin
29a Cutout portion
29b Protruding portion
29c Cover portion
30 Rotor
31 Shaft
32 Hub
33 Blade
33a Suction port
33b Discharge port
34 Yoke
35 Magnet
40 Fan motor
41 Casing
43 Blade
43a Suction port
43b Discharge port
49 Mold body
50 Fan motor
51 Casing
52 Shaft
55 Bearing housing
56 Ball bearing
57 Ball bearing
59 Mold body
59a Lead-out portion
60 Rotor
62 Hub
63 Blade
63a Suction port
63b Discharge port
65 Magnet
70 Stator
71 Stator core
72 Bobbin
73 Coil
75 Lead wire
C Stator assembly

The invention claimed is:

1. A motor comprising:
a stator;
a circuit board configured to supply a current to the stator;
a rotor rotating by the current supplied to the stator;
a lead wire connecting an external power supply to the circuit board;
a first mold resin covering at least a portion of the stator, at least a portion of the circuit board, and a portion of the lead wire; and
a second mold resin covering a predetermined range from the first mold resin of the lead wire led out from the first mold resin,
wherein the second mold resin has hardness lower than hardness of the first mold resin, and
a protruding portion that is composed of the first mold resin is provided at a portion of an outer circumferential part of the first mold resin where the lead wire is led out, and
the second mold resin covers the lead wire led out from the protruding portion.

2. The motor according to claim 1,
wherein a concave portion or a cutout portion is provided at a portion of the protruding portion where the lead wire is led out, and
the second mold resin is provided at the concave portion or the cutout portion.

3. The motor according to claim 1,
wherein the second mold resin forms a protruding portion protruding from the protruding portion of the first mold resin.

4. The motor according to claim 1,
wherein a concave portion or a cutout portion is provided at the protruding portion where the lead wire is led out, and
the second mold resin is provided at the concave portion or the cutout portion, and
the second mold resin forms a protruding portion protruding from the protruding portion of the first mold resin.

5. The motor according to claim 1,
wherein the first mold resin and the second mold resin are thermosetting resins, and
a curing start temperature of the second mold resin is lower than a curing start temperature of the first mold resin.

6. The motor according to claim 1,
wherein the hardness at 23° C. of the first mold resin is D70 or more, and
the hardness at 23° C. of the second mold resin is A90 or less.

7. The motor according to claim 1,
wherein the first mold resin is an epoxy resin and the second mold resin is a urethane resin.

8. The motor according to claim 1,
wherein a concave portion or a cutout portion is provided at a portion of an outer circumferential part of the first mold resin where the lead wire is led out, and wherein, in a side view, the second mold resin is provided at an lower portion of the concave portion or the cutout portion and the second mold resin is not provided at an upper portion of the concave portion or the cutout portion.

9. The motor according to claim 1,
wherein the first mold resin and the second mold resin are made of thermoplastic resins.

10. The motor according to claim 2,
wherein at least the portion of the stator, at least the portion of the circuit board, and the portion of the lead wire are covered with the first mold resin to form a mold body, and
wherein the second mold resin is formed so as not to protrude from a contour of the mold body.

11. The motor according to claim 2,
wherein the concave portion has a cutout shape where an arc-shaped portion is missing in a plan view.

12. The motor according to claim 4,
wherein the second mold resin forming the protruding portion is provided integrally with the second mold resin provided at the concave portion or the cutout portion.

13. A motor comprising:
a stator;
a circuit board configured to supply a current to the stator;
a rotor rotating by the current supplied to the stator;
a lead wire connecting an external power supply to the circuit board;
a first mold resin covering at least a portion of the stator, at least a portion of the circuit board, and a portion of the lead wire; and
a second mold resin covering a predetermined range from the first mold resin of the lead wire led out from the first mold resin,
wherein the second mold resin has hardness lower than hardness of the first mold resin, and
the plurality of the lead wires are formed being led out from the first mold resin or the second mold resin, and
at least one cover portion covering an outer circumference of each lead wire with the second mold resin in a predetermined range from the first mold resin or the second mold resin is provided,
wherein a protruding portion is provided at a portion of an outer circumferential part of the first mold resin where the plurality of lead wires are led out, and
the second mold resin covers the plurality of lead wires led out from the protruding portion.

14. The motor according to claim 5,
wherein a difference between the curing start temperature of the first mold resin and the curing start temperature of the second mold resin is 10° C. or higher.

15. The motor according to claim 6,
wherein the hardness of the second mold resin at 23° C. is from A30 to A80.

16. The motor according to claim 6,
wherein the hardness of the first mold resin at 23° C. is from D80 to D95, a glass transition point of the first mold resin is 125° C. or higher, and a linear expansion coefficient of the first mold resin at or below the glass transition point is $4 \times 10^{-5}$/° C. or less.

17. The motor according to claim 13,
wherein the at least one cover portion comprises a plurality of cover portions, and adjacent cover portions of the plurality of cover portions are joined.

* * * * *